United States Patent
Wijnands et al.

(10) Patent No.: US 10,924,395 B2
(45) Date of Patent: Feb. 16, 2021

(54) SEAMLESS MULTIPOINT LABEL DISTRIBUTION PROTOCOL (MLDP) TRANSPORT OVER A BIT INDEX EXPLICIT REPLICATION (BIER) CORE

(71) Applicant: Cisco Technology, Inc., San Jose, CA (US)

(72) Inventors: Ijsbrand Wijnands, Leuven (BE); Mankamana Prasad Mishra, Dublin, CA (US); Nagendra Kumar Nainar, Morrisville, NC (US); Luc De Ghein, Deinze (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/358,421

(22) Filed: Mar. 19, 2019

(65) Prior Publication Data

US 2020/0304405 A1 Sep. 24, 2020

(51) Int. Cl.
*H04L 12/723* (2013.01)
*H04L 12/751* (2013.01)
*H04L 12/761* (2013.01)

(52) U.S. Cl.
CPC ............ *H04L 45/507* (2013.01); *H04L 45/02* (2013.01); *H04L 45/16* (2013.01)

(58) Field of Classification Search
None
See application file for complete search history.

(56) References Cited

U.S. PATENT DOCUMENTS

| | | | | |
|---|---|---|---|---|
| 9,197,451 | B2* | 11/2015 | Zheng | H04L 12/66 |
| 9,344,359 | B1* | 5/2016 | Tiruveedhula | H04L 45/50 |
| 9,590,845 | B1* | 3/2017 | Esale | H04L 41/0668 |
| 9,602,354 | B1* | 3/2017 | Esale | H04L 45/74 |
| 2008/0225864 | A1* | 9/2008 | Aissaoui | H04L 45/04 370/401 |
| 2011/0096780 | A1* | 4/2011 | Darwish | H04L 45/507 370/392 |
| 2012/0033664 | A1* | 2/2012 | Pignataro | H04L 45/507 370/389 |

(Continued)

OTHER PUBLICATIONS

Bidgoli, Xu et al., PIM Signaling Through BIER Core (draft-ietf-bier-pim-signaling-06), Apr. 23, 2019, 14 pages.

(Continued)

*Primary Examiner* — Chi H Pham
*Assistant Examiner* — Vladislav Y Agureyev
(74) *Attorney, Agent, or Firm* — Merchant & Gould P.C.

(57) ABSTRACT

Seamless multipoint label distribution protocol (mLDP) transport over a bit index explicit replication (BIER) core may be provided. First, it may be determined that a first plurality of network devices comprise BIER edge routers. Then, in response to determining that the first plurality of network devices comprise BIER edge routers, a Targeted Label Distribution Protocol (T-LDP) session may be created between a first one of the first plurality of network devices and a second one of the first plurality of network devices. Next, an address of a peer device connected to the second one of the first plurality of network devices may be advertised by the second one of the first plurality of network devices over the T-LDP session.

18 Claims, 3 Drawing Sheets

(56) References Cited

U.S. PATENT DOCUMENTS

| | | | |
|---|---|---|---|
| 2014/0269254 A1* | 9/2014 | Choorakkot Edakkunni | H04L 45/563 370/218 |
| 2014/0269747 A1* | 9/2014 | Jain | H04L 12/4641 370/410 |
| 2015/0078378 A1* | 3/2015 | Wijnands | H04L 12/18 370/390 |
| 2015/0085635 A1* | 3/2015 | Wijnands | H04L 45/16 370/216 |
| 2015/0092776 A1* | 4/2015 | Wijnands | H04L 45/36 370/392 |
| 2015/0181309 A1* | 6/2015 | Shepherd | H04N 21/6125 725/109 |
| 2015/0244615 A1* | 8/2015 | Esale | H04L 45/507 370/389 |
| 2016/0127139 A1* | 5/2016 | Tian | H04L 12/185 370/390 |
| 2016/0127142 A1* | 5/2016 | Tian | H04L 12/1886 370/390 |
| 2016/0254991 A1* | 9/2016 | Eckert | H04L 12/4633 370/225 |
| 2016/0301628 A1* | 10/2016 | Wijnands | H04L 49/201 |
| 2017/0310589 A1* | 10/2017 | Tambakuwala | H04L 45/023 |
| 2018/0205636 A1* | 7/2018 | Hu | H04L 45/48 |
| 2018/0278521 A1* | 9/2018 | Pfister | H04L 69/22 |
| 2019/0097943 A1* | 3/2019 | Kotalwar | H04L 47/806 |
| 2019/0132143 A1* | 5/2019 | Wei | H04L 47/35 |
| 2019/0394055 A1* | 12/2019 | Zhang | H04L 12/18 |
| 2019/0394059 A1* | 12/2019 | Zhang | H04L 12/4641 |
| 2020/0007358 A1* | 1/2020 | Bidgoli | H04L 45/50 |
| 2020/0053000 A1* | 2/2020 | Zhang | H04L 45/16 |
| 2020/0120013 A1* | 4/2020 | Goud Gadela | H04L 45/16 |
| 2020/0120020 A1* | 4/2020 | Dutta | H04L 12/66 |

OTHER PUBLICATIONS

Bidgoli, H. et al., "M-LDP Signaling Through Bier Core, draft-hj-bier-signaling-00"; Internet Draft: Bier Workgroup, Internet Engineering Task Force, IETF; Standard Working Draft, Internet Society (ISOC) Geneva, Sitzerland; Retrieved Jul. 2, 2018 (18 pages).

Wijnands, Ij et al. "Multicast Using Bit Index Explicit Replication (BIER) rfc8279.txt"; Internet Engineering Task Force, IETF; Standard Internet Society (ISOC) Geneva, Switzerland, Retrieved Nov. 20, 2017 (43 pages).

Anderson, L. et al. "LDP Specification; rfc5036.txt", IETF; Standard Internet Society (ISOC) Geneva, Switzerland, Retrieved Oct. 1, 2007 (135 pages).

International Search Report and Written Opinion issued in International Patent Application PCT/US2020/022088 dated Jun. 25, 2020 (18 pages).

* cited by examiner

US 10,924,395 B2

SEAMLESS MULTIPOINT LABEL DISTRIBUTION PROTOCOL (MLDP) TRANSPORT OVER A BIT INDEX EXPLICIT REPLICATION (BIER) CORE

TECHNICAL FIELD

The present disclosure relates generally to mLDP transport, in particular to mLDP transport over a BIER core.

BACKGROUND

Multi-Protocol Label Switching (MPLS) is a type of data-carrying technique for high-performance telecommunications networks that directs data from one network node to the next based on short path labels rather than long network addresses, avoiding complex lookups in a routing table. The labels identify virtual links (paths) between distant nodes rather than endpoints. MPLS can encapsulate packets of various network protocols, hence its name "multiprotocol". MPLS supports a range of access technologies, including T1/E1, ATM, Frame Relay, and DSL.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
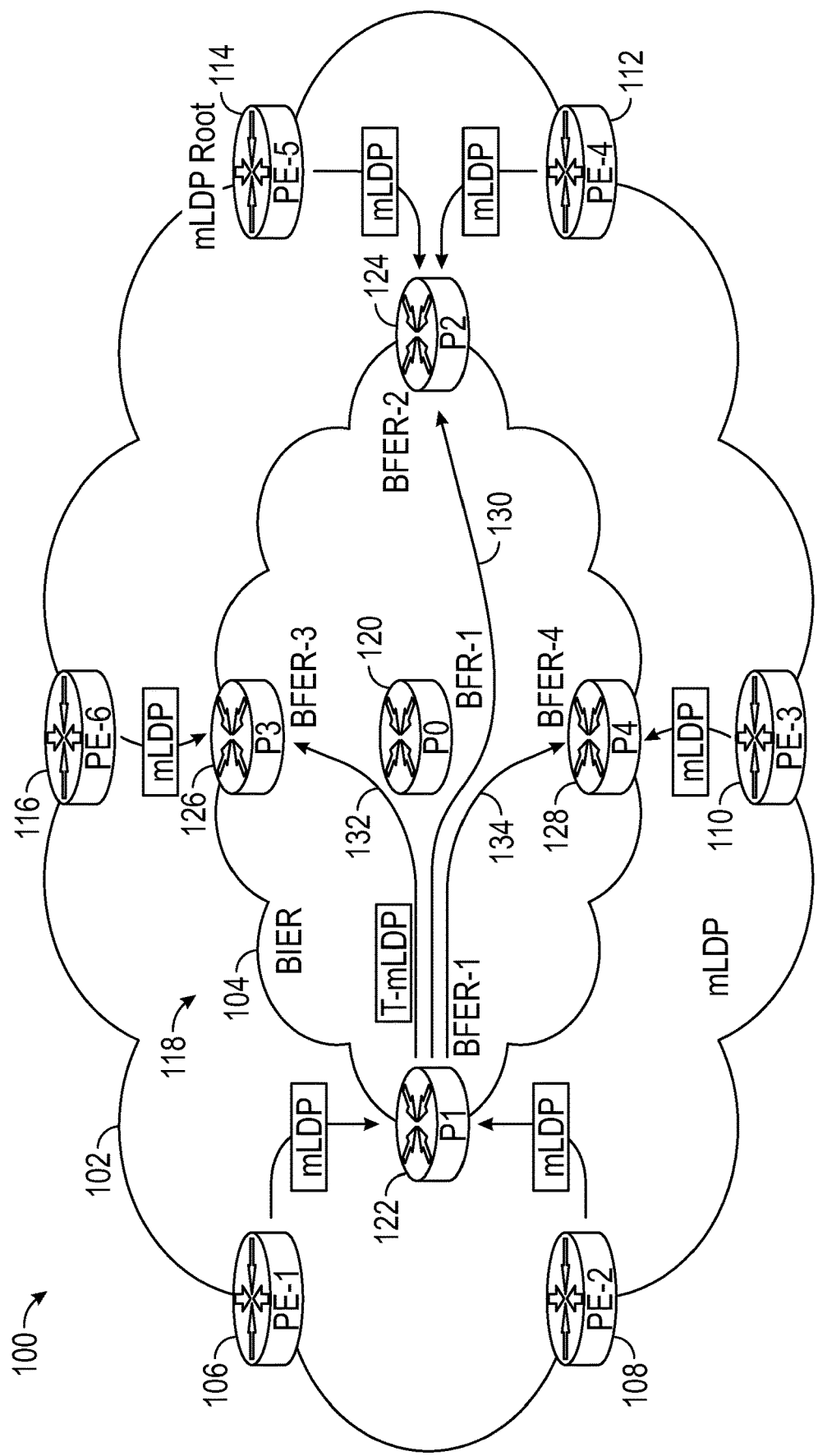
FIG. 1 shows an operating environment for providing seamless multipoint Label Distribution Protocol (mLDP) transport over a Bit Index Explicit Replication (BIER) core.

Seamless multipoint label distribution protocol (mLDP) transport over a bit index explicit replication (BIER) core may be provided. First, it may be determined that a first plurality of network devices comprise BIER edge routers. Then, in response to determining that the first plurality of network devices comprise BIER edge routers, a Targeted Label Distribution Protocol (T-LDP) session may be created between a first one of the first plurality of network devices and a second one of the first plurality of network devices. Next, an address of a peer device connected to the second one of the first plurality of network devices may be advertised by the second one of the first plurality of network devices over the T-LDP session.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In conventional Internet Protocol (IP) multicast forwarding, packets of a given multicast "flow" may be forwarded along a tree that may have been constructed for a specific purpose of carrying the flow. This may require transit nodes to maintain state on a per-flow basis, and may require the transit nodes to participate in multicast-specific tree building protocols. The flow to which a packet belongs may be determined by its IP source and destination address fields.

Bit Index Explicit Replication (BIER) may comprise an alternative process for multicast forwarding. It may not require any multicast-specific trees, and hence may not require any multicast-specific tree building protocols. Within a given "BIER domain", an ingress node may encapsulate a multicast data packet in a "BIER header". The BIER header may identify a packet's egress nodes in that domain. Each possible egress node may be represented by a single bit within a bitstring. To send a packet to a particular set of egress nodes, an ingress node may set the bits for each of those egress nodes, and may clear other bits in the bitstring. Each packet may then be forwarded along a unicast shortest path tree from the ingress node to the egress nodes. Thus there may be no per-flow forwarding entries with BIER.

Because of the aforementioned advantages of BIER, service providers may desire migration strategies to introduce BIER into networks for multicast distribution. Consistent with embodiments of the disclosure, one migration strategy may comprise introducing BIER in core (P) routers of an existing network, and keeping multipoint Label Distribution Protocol (mLDP) on the edge (PE) routers. This may be beneficial because the P routers may be simpler (e.g., run less features), and may allow for a phased introduction of BIER leaving the PE routers unaltered. Deploying BIER in the core of the network may significantly reduce the amount of multicast state in the core network.

Embodiments of the disclosure may allow mLDP to be deployed over a BIER core with a minimal configuration overhead by using Targeted mLDP (T-mLDP) sessions with new extensions. Accordingly, stitching of mLDP to BIER on the P routers may be provided.

FIG. 1 shows an operating environment 100 consistent with embodiments of the disclosure for providing seamless mLDP transport over a BIER core. As shown in FIG. 1, operating environment 100 may comprise a network 102. Network 102 may comprise a BIER core 104 and a plurality of mLDP edge routers. The plurality of mLDP edge routers may comprise a first mLDP edge router 106 (i.e., PE-1), a second mLDP edge router 108 (i.e., PE-2), a third mLDP edge router 110 (i.e., PE-3), a fourth mLDP edge router 112 (i.e., PE-4), a fifth mLDP edge router 114 (i.e., PE-5), and a sixth mLDP edge router 116 (i.e., PE-6).

BIER core 104 may comprise a plurality of BIER edge routers 118 and a BIER core device 120 (i.e., P0) (e.g., a core router). Plurality BIER edge routers 118 may comprise a first BIER edge router 122 (i.e. P1), a second BIER edge router 124 (i.e. P2), a third BIER edge router 126 (i.e. P3), and a fourth BIER edge router 128 (i.e. P4).

With conventional systems, each node in a network may run an mLDP session. For example, with conventional systems, a leaf node may initiate mLDP signaling towards a root of a tree where the whole core may use mLDP enabled signaling. Embodiments of the disclosure, as illustrated in FIG. 1, may provide, for example, a migration strategy for service providers to move to a BIER core while keeping the edge routers (i.e., PE's) unchanged. Accordingly, mLDP may be used from the edge routers to a BIER core.

The elements described above of operating environment 100 (e.g., the plurality of mLDP edge routers and plurality BIER edge routers 118) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
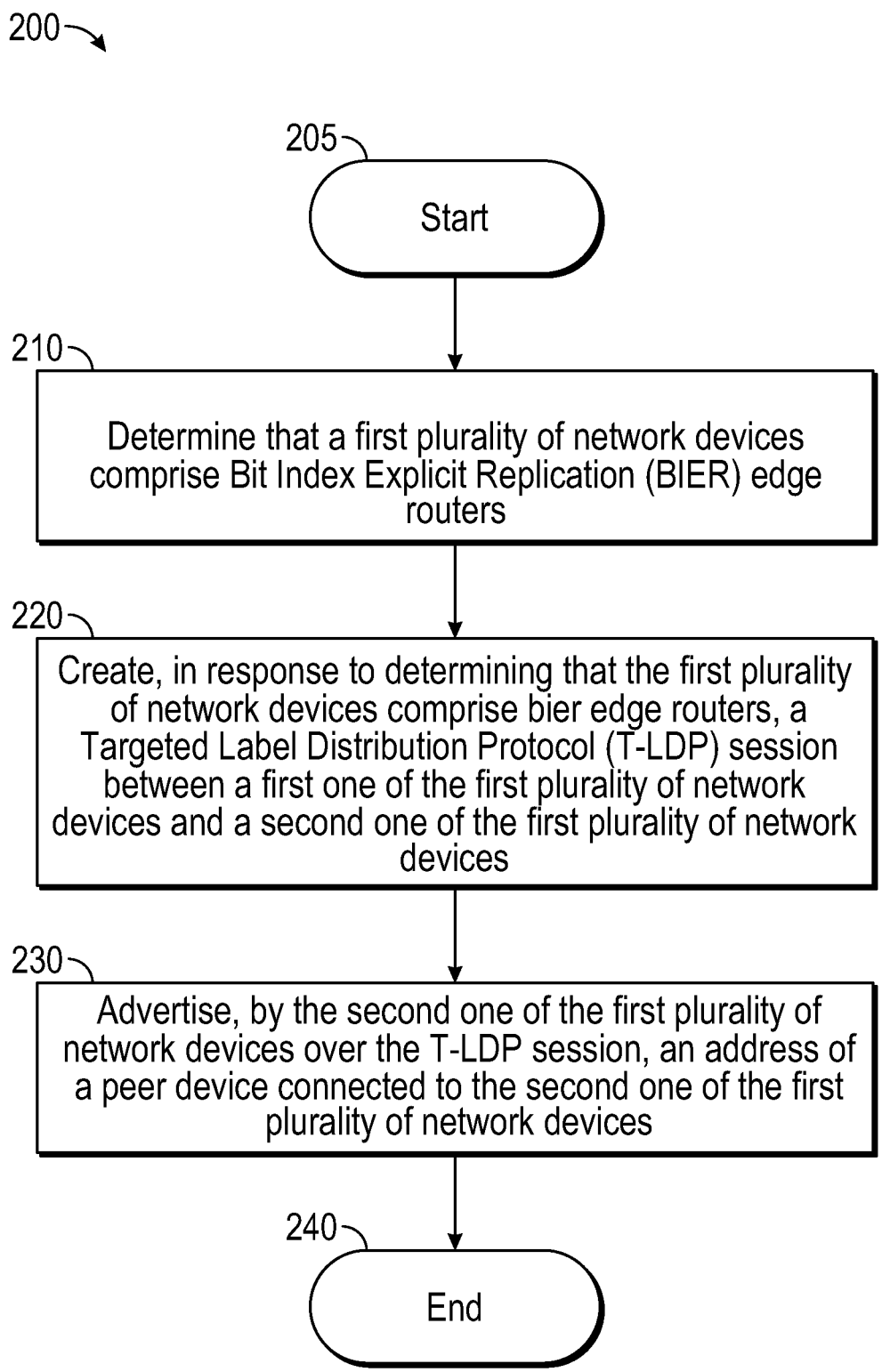
FIG. 2 is a flow chart of a method for providing seamless mLDP transport over a BIER core.

FIG. 2 is a flow chart setting forth the general stages involved in a method 200 consistent with an embodiment of the disclosure for providing seamless mLDP transport over a BIER core. Method 200 may be implemented using operating environment 100 described in more detail above with respect to FIG. 1. Ways to implement the stages of method 200 will be described in greater detail below.

Method 200 may begin at starting block 205 and proceed to stage 210 where it may be determined that a first plurality of network devices (e.g., any two or more of plurality BIER edge routers 118) comprise BIER edge routers. For example, one of the challenges of seamlessly transporting mLDP over a BIER core may be how to determine where BIER core starts 104.

As shown in FIG. 1, BIER core 104 may connect all the P routers (i.e., BIER core device 120 and plurality of BIER edge routers 118). Each of the Egress/Ingress P routers (i.e., plurality of BIER edge routers 118) may have been configured with a Bit Forwarding Egress Router Identifier (BFER ID). For example, first BIER edge router 122 may have BFER ID "BFER-1", second BIER edge router 124 may have BFER ID "BFER-2", third BIER edge router 126 may have BFER ID "BFER-3", and fourth BIER edge router 128 may have BFER ID "BFER-4". The PE routers (e.g., the plurality of mLDP edge routers) may be directly connected to the Egress/Ingress P routers and may have established mLDP sessions.

The plurality of mLDP edge routers may only run mLDP and plurality of BIER edge routers 118 may run both mLDP and BIER. Embodiments of the disclosure may first determine which routers in network 102 are plurality of BIER edge routers 118 (i.e., the Egress/Ingress P routers) in order to establish targeted LDP sessions.

As stated above, plurality of BIER edge routers 118 may each be configured with a BFER ID. When plurality of BIER edge routers 118 are configured with a BFER ID, this ID may be associated with a loopback address and announced in the Interior Gateway Protocol (IGP) and advertised. Each router that is part of this IGP may receive the BIER specific announcements. These BFER ID to Prefix mappings may be installed into a Routing Information Base (RIB) corresponding to network 102. Because LDP may also be connected to the RIB, it may learn the BIER BFER ID's from the RIB. Embodiments of the disclosure may determine which routers in network 102 are plurality of BIER edge routers 118 by leaning from the RIB which routers have a BFER ID.

From stage 210, where it may be determined that the first plurality of network devices comprise BIER edge routers, method 200 may advance to stage 220 where a Targeted Label Distribution Protocol (T-LDP) session between a first one of the first plurality of network devices and a second one of the first plurality of network devices may be created in response to determining that the first plurality of network devices comprise BIER edge routers. For example, embodiments of the disclosure may use the aforementioned BFER's prefix addresses that were learned from the RIB to create a full mesh of T-LDP sessions among plurality of BIER edge routers 118. For example, a first T-LDP session 130 may be created between first BIER edge router 122 and second BIER edge router 124, a second T-LDP session 132 may be created between first BIER edge router 122 and third BIER edge router 126, and a third T-LDP session 134 may be created between first BIER edge router 122 and fourth BIER edge router 128. Although not shown in FIG. 1, a T-LDP session may be created between all plurality of BIER edge routers 118.

LDP may comprise a protocol in which routers capable of MPLS can exchange label mapping information. Two routers with an established session are called LDP peers and the exchange of information may be bi-directional. LDP may be used to build and maintain LSP databases that may be used to forward traffic through the MPLS networks. Targeted LDP sessions may be different because, during the discovery phase, hellos are unicast to the LDP peer rather than using multicast. Consequently, T-LDP may be set up between non-directly connected peers. Consistent with embodiments of the disclosure, BIER BFER ID announcements may be used to setup a full mesh of Targeted LDP sessions.

BIER core device 120 (i.e., P0) in the middle of BIER core 104 does not have a BFER ID. Furthermore, BIER core device 120 may run BIER only and not mLDP. Accordingly, BIER core device 120 will not be considered to setting up a T-LDP session. The number of P nodes in a network may be much smaller compared to the PE routers, so this may not be a scale concern.

Once the T-LDP session (e.g., first T-LDP session 130) between the first one of the first plurality of network devices (e.g., first BIER edge router 122) and the second one of the first plurality of network devices (e.g., second BIER edge router 124) is created in stage 220, method 200 may continue to stage 230. At stage 230, second BIER edge router 124 may advertise, over first T-LDP session 130, an address of a peer device (e.g., fifth mLDP edge router 114) connected to second BIER edge router 124.

Having the T-LDP sessions created above may not enough. For example, if second mLDP edge router 108 (i.e., PE-2) is sending a mLDP Label Mapping towards an mLDP Root (e.g., fifth mLDP edge router 114 (i.e., PE-5)), second mLDP edge router 108 may do a route lookup on the Root address in the RIB, and find that the next-hop is first BIER edge router 122 (i.e. P1). Since the next-hop (i.e., first BIER edge router 122) is directly connected to second mLDP edge router 108, second mLDP edge router 108 may be able to find the correct LDP session to send the Label Mapping on. First BIER edge router 122 may try to do the same thing, lookup the root address of fifth mLDP edge router 114 in the RIB. This will return BIER core device 120 (i.e., P0) as the next-hop. However, BIER core device 120, is not a LDP peer because BIER core device 120 is not running mLDP and no label mapping can be sent. To correct this issue, embodiments of the disclosure may provide a process where first BIER edge router 122 may be able to determine that the targeted LDP session to second BIER edge router 124 (i.e. P2) may comprise the right LDP neighbor to send the Label Mapping.

When mLDP does a route lookup on the Root address, the directly connected next-hop address is returned. This directly connected address may be used to do a lookup in the database that has all the directly connected addresses of all the LDP peers. These addresses may be advertised using the "Address Message" when establishing the LDP peer. However, first BIER edge router 122 (i.e., P1) only knows about the connected addresses of second BIER edge router 124 (i.e. P2), third BIER edge router 126 (i.e. P3), and fourth BIER edge router 128 (i.e. P4). Consequently, first BIER edge router 122 (i.e., P1) may be unable to determine that fifth mLDP edge router 114 (i.e., PE-5) is reachable through first T-LDP session 130 to second BIER edge router 124 (i.e. P2).

Embodiments of the disclosure may provide an LDP Message Type, which is like the "Address Message", but allows to "proxy" advertise connected addresses of its LDP peers. For example, second BIER edge router 124 (i.e. P2) may advertise its own connected addresses as normal, but may also advertise the addresses it has learned from fourth mLDP edge router 112 (i.e., PE-4) and fifth mLDP edge router 114 (i.e., PE-5). These may be advertised, one-hop, over the T-LDP sessions towards first BIER edge router 122 (i.e. P1), third BIER edge router 126 (i.e. P3), and fourth BIER edge router 128 (i.e. P4). When first BIER edge router 122 (i.e. P1) does the RIB lookup on the Root address, the next-hop points to BIER core device 120. BIER core device 120 (i.e., P0) will not find an LDP peer for that next-hop.

To address this, embodiments of the disclosure may add an exception in the mLDP logic to use the Root address and do a lookup in the connected address data-base. Due to the aforementioned process, first BIER edge router 122 will find a connected address (being fifth mLDP edge router 114 (i.e., PE-5)), associated with first T-LDP session 130 to second BIER edge router 124 (i.e. P2). The mLDP Label Mapping may be forwarded to second BIER edge router 124 (i.e. P2) that may do the normal mLDP procedures. Accordingly, LDP peers connected over BIER core 104 may "proxy" advertise the connected addresses from its peers, such that the downstream mapping of the Root node to LDP Peer works.

In addition, it may be possible that a PE router is connected to multiple P routers. A downstream P router may then see multiple candidate upstream P routers (via the Targeted LDP session) that are announcing reachability to the Root address. If there are multiple candidate upstream P routers, the P router may be chosen with the best metric from the RIB, if equal, some load balancing logic may be applied to pick one.

Consequently, embodiments of the disclosure may use the BIER BFER ID announcements to setup a full mesh of T-LDP sessions. Then, the connected addresses may be proxy advertise over the T-LDP sessions. Accordingly, routers on edge of BIER network 104 may be able to determine which T-LDP peer can be used to reach the mLDP root address without being directly connected to it. After second BIER edge router 124 advertises the address in stage 230, method 200 may then end at stage 240.

Figure 3:
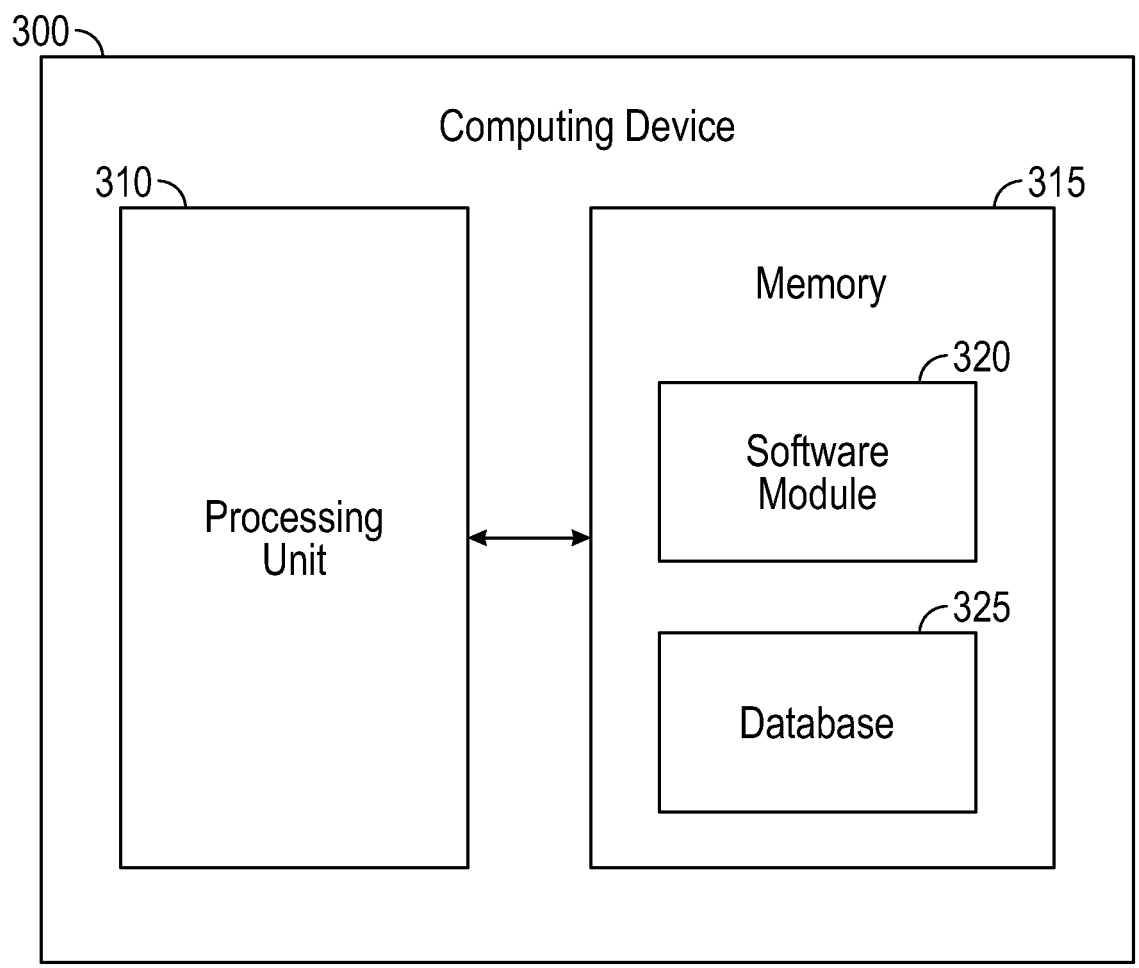
FIG. 3 shows a computing device.

FIG. 3 shows a computing device 300. As shown in FIG. 3, computing device 300 may include a processing unit 310 and a memory unit 315. Memory unit 315 may include a software module 320 and a database 325. While executing on processing unit 310, software module 320 may perform processes for providing seamless mLDP transport over a BIER core, including for example, any one or more of the stages from method 200 described above with respect to FIG. 2. Computing device 300, for example, may provide an operating environment the plurality of mLDP edge routers and the plurality BIER edge routers. The plurality of mLDP edge routers and the plurality BIER edge routers may operate in other environments and are not limited to computing device 300.

Computing device 300 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multi-processor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining that a first plurality of network devices comprise Bit Index Explicit Replication (BIER) edge routers;
   creating, in response to determining that the first plurality of network devices comprise BIER edge routers, a Targeted Label Distribution Protocol (T-LDP) session between a first one of the first plurality of network devices and a second one of the first plurality of network devices;
   advertising, by the second one of the first plurality of network devices over the T-LDP session, an address of a peer device connected to the second one of the first plurality of network devices; and
   placing an entry in a proxy database, wherein the entry indicates a connection between the peer device and the second one of the first plurality of network devices.

2. The method of claim 1, further comprising using the proxy database to determine that the peer device is connected to the second one of the first plurality of network devices.

3. The method of claim 1, wherein determining that the first plurality of network devices comprise BIER edge routers comprises determining that each of the first plurality of network devices has a Bit Forwarding Egress Router Identifier (BFER ID).

4. The method of claim 3, wherein determining that each of the first plurality of network devices has the BFER ID comprises querying a Routing Information Base (RIB).

5. The method of claim 1, further comprising:
   configuring the first plurality of network devices as BIER edge routers;
   advertising, by each of the first plurality of network devices, corresponding BFER IDs; and
   storing each of the corresponding BFER IDs in a RIB.

6. The method of claim 1, wherein the peer device is not configured to use BIER.

7. The method of claim 1, wherein the peer device is configured to use Label Distribution Protocol (LDP).

8. The method of claim 1, wherein the first plurality of network devices are configured to use BIER and LDP.

9. The method of claim 1, wherein the first plurality of network devices are connected to a core device configured to use BIER and not configured to use LDP.

10. The method of claim 1, wherein the first plurality of network devices are disposed in a BIER network serving as a core of an LDP network.

11. A method comprising:
    determining that a first plurality of network devices comprise Bit Index Explicit Replication (BIER) edge routers;
    creating, in response to determining that the first plurality of network devices comprise BIER edge routers, a Targeted Label Distribution Protocol (T-LDP) session between a first one of the first plurality of network devices and a second one of the first plurality of network devices;
    using a proxy database to determine that a peer device is connected to the second one of the first plurality of network devices; and
    forwarding label mapping for the peer device to the second one of the first plurality of network devices.

12. The method of claim 11, further comprising advertising, by the second one of the first plurality of network devices over the T-LDP session, an address of the peer device connected to the second one of the first plurality of network devices.

13. The method of claim 12, further comprising placing an entry in the proxy database, wherein the entry indicates a connection between the peer device and the second one of the first plurality of network devices.

14. The method of claim 11, wherein determining that the first plurality of network devices comprise BIER edge routers comprises determining that each of the first plurality of network devices has a Bit Forwarding Egress Router Identifier (BFER ID).

15. An apparatus comprising:
a memory storage disposed in a first network device comprising a Bit Index Explicit Replication (BIER) edge router; and
a processing unit coupled to the memory storage, wherein the processing unit is operative to:
  determine that a second network device comprises a BIER edge router,
  create, in response to determining that the second network device comprises a BIER edge router, a Targeted Label Distribution Protocol (T-LDP) session between the first network device and the second network device,
  advertising, by the second device over the T-LDP session, an address of a peer device connected to the second network device, and
  placing an entry in a proxy database, wherein the entry indicates a connection between the peer device and the second network device.

16. The apparatus of claim 15, wherein the first network device and the second network device are configured to use BIER and LDP.

17. The apparatus of claim 15, wherein the first network device and the second network device are connected to a core device configured to use BIER and not configured to use LDP.

18. The apparatus of claim 15, wherein the first network device and the second network device are disposed in a BIER network serving as a core of an LDP network.

* * * * *